Aug. 26, 1958 — L. M. HOPLA — 2,849,158
POURING SPOUT AND STRAINER FOR PAINT CAN
Filed July 6, 1954 — 2 Sheets-Sheet 1
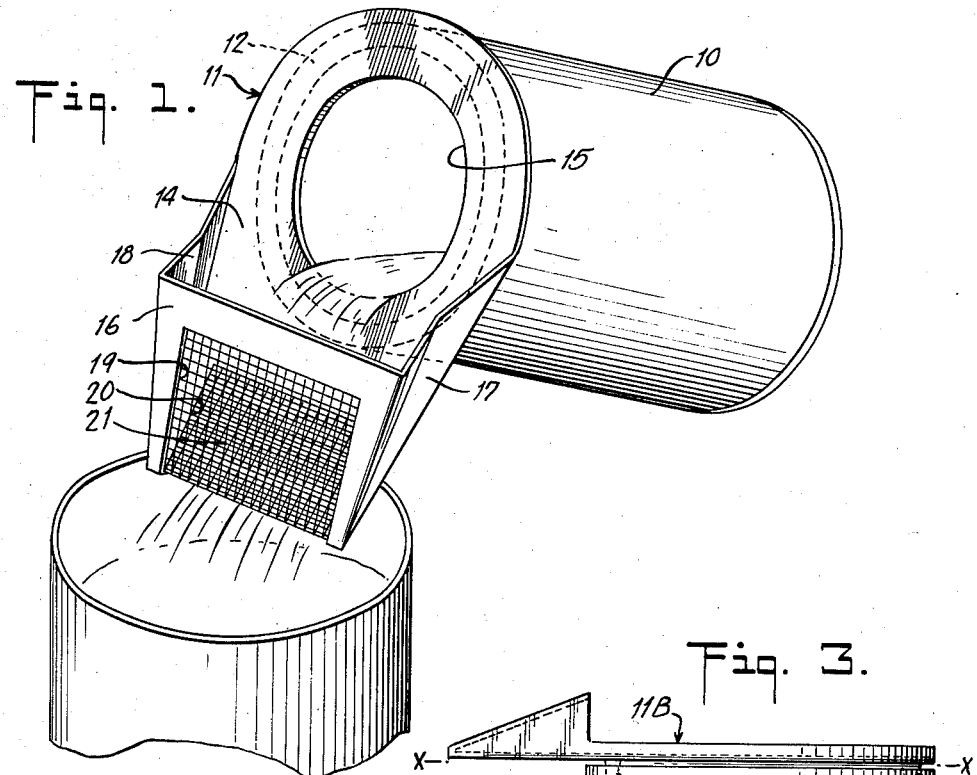
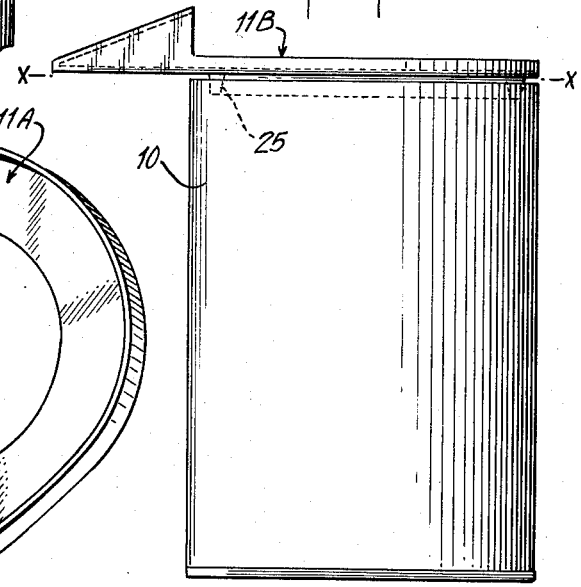
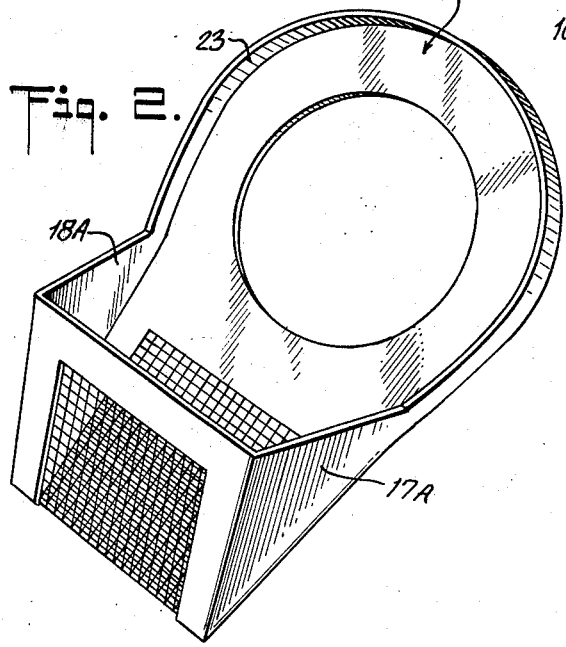
INVENTOR.
LLOYD MELVIN HOPLA
BY
ATTORNEY Aug. 26, 1958 L. M. HOPLA 2,849,158
POURING SPOUT AND STRAINER FOR PAINT CAN
Filed July 6, 1954 2 Sheets-Sheet 2
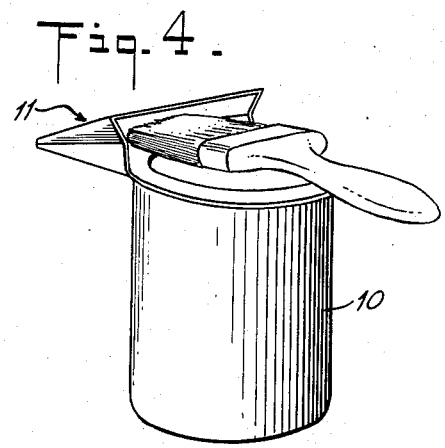
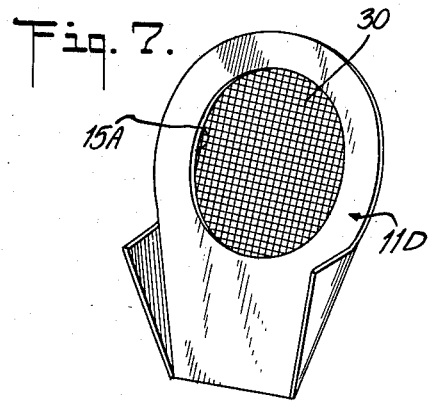
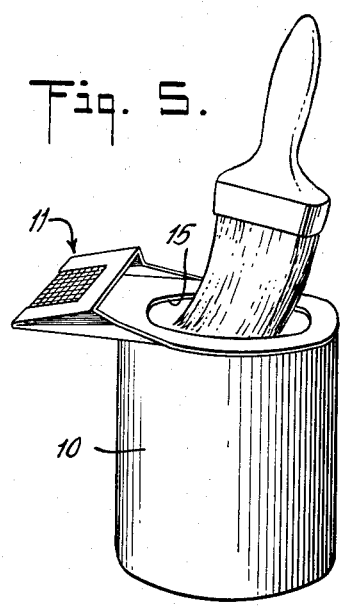
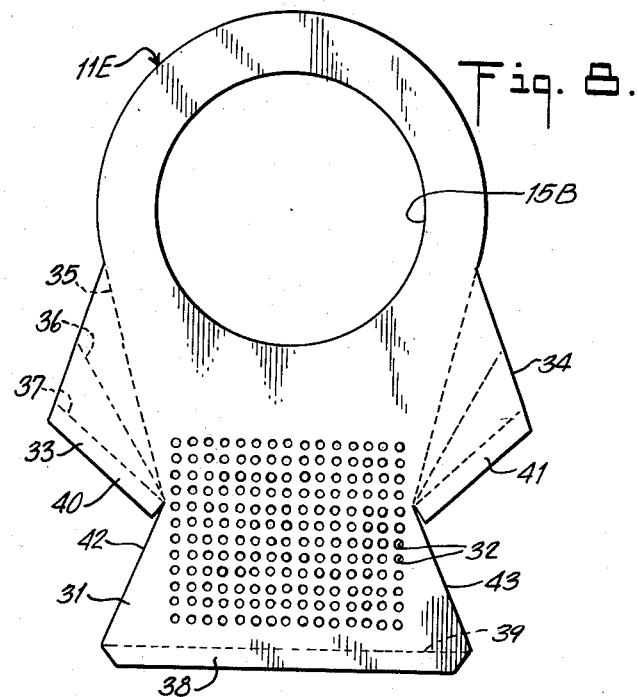
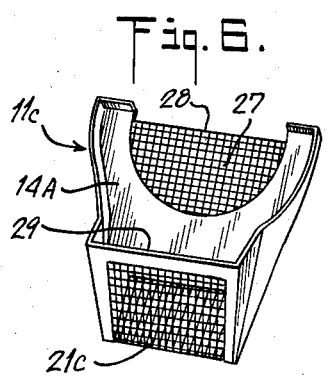
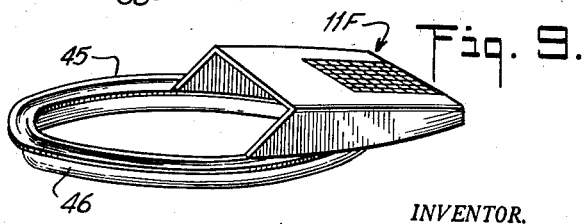
INVENTOR.
LLOYD MELVIN HOPLA
BY
ATTORNEY

United States Patent Office 2,849,158
Patented Aug. 26, 1958

2,849,158

POURING SPOUT AND STRAINER FOR PAINT CAN

Lloyd M. Hopla, Keyport, N. J.

Application July 6, 1954, Serial No. 441,196

8 Claims. (Cl. 222—189)

This invention relates to the combination pouring spout and strainer for a paint can and more particularly to a pouring spout and strainer that may be easily attached to a paint can or similar article containing liquid.

This invention relates to a pouring spout and strainer that is to be attached to the common type of paint can after the cover has been removed. The manner of attaching may be by a simple adhesive or may be attached to the chime of the can.

It is an object of this invention to provide a pouring spout and strainer element which is also a chime cover to provide a neat, useful device that will control the pouring of paint out of the can without permitting the paint to enter the chime of the can or spill over the sides of the can.

It is a further object of this invention to provide a pouring spout and strainer which also covers the chime of the can so that paint that is poured from the can may be thoroughly strained before using.

A still further object of this invention is to provide a pouring spout and strainer that is affixed to the paint can after the cover has been removed and provides a means to economically return to the paint can excess paint that is not poured.

A further object of this invention is to provide a pouring spout and strainer that may be adhesively attached to the paint can after the cover has been removed to, in turn, cover the chime of the paint can and provide a neat and economical means of controlling the paint that is removed from the paint can.

A still further object of this invention is to provide a pouring spout that is also a chime cover that may be affixed to the paint can by adhesion after the cover has been removed and provide not only a means to pour paint from the paint can but a means to return all paint to the paint can, such as when a brush is wiped on the edge of the paint can.

A still further object of this invention is to provide a pouring spout and strainer for a paint can that is affixed to the paint can after the cover has been removed to, in turn, cover the chime of the paint can and provide a strainer for all paint that is poured from the can and, in addition, strain all residue draining back into the can.

A still further object of this invention is to provide a flat cardboard element that may be bent and formed into a pouring spout and strainer for a paint can and adhesively affixed to cover the chime of the paint can after the cover has been removed.

Other objects of this invention shall be apparent by reference to the accompanying detailed description and the drawings, in which Fig. 1 is a perspective view of a paint can with the pouring spout and strainer affixed to cover the chime of the paint can;

Fig. 2 is a further embodiment of the pouring spout and strainer illustrated in Fig. 1;

Fig. 3 is a still further embodiment of the pouring spout and strainer illustrated in Figs. 1 and 2;

Fig. 4 is a perspective view of a paint can with the pouring spout and strainer of Fig. 1 attached thereto;

Fig. 5 is a perspective view of the same element illustrated in Fig. 4 showing a further use;

Fig. 6 is a further embodiment of the pouring spout and strainer;

Fig. 7 is a still further embodiment of the pouring spout and strainer;

Fig. 8 is a plan view of a flat cardboard element that may be formed into a pouring spout and strainer for a paint can, and Fig. 9 is a preformed pouring spout and strainer that may be mounted into the chime of a paint can.

Referring to Fig. 1, there is illustrated a paint can 10 with the cover (not shown) removed. At the open end 12 of the paint can a pouring spout and strainer element 11 is affixed to the open face 12 of the paint can. Element 11 may be affixed by a coat of adhesive on the lower face of element 11 so that merely pressing element 11 against the face 12 will provide sufficient retention to maintain element 11 affixed during a pouring of paint from the paint can 10. Element 11 is a four sided portion of triangular cross section having one side 14 extended into a circular portion having a circular aperture 15 which should be slightly less in diameter than the aperture of the paint can to which it is affixed. This is determined by providing elements 11 of different sizes so that they appropriately fit the various standard sizes of paint cans. The outer perimeter of element 11 necessarily extends over and beyond the outer circumference of the end 12 of the paint can 10. The flat portion 14 of element 11 extends beyond the paint can in one portion of the element to form a triangular shaped pouring spout that is, portion 14 extends to an extreme point where it is folded back upon itself to form another face 16 that is at an angle to face 14. Either side of the two planes 14 and 16 are enclosed by portions 17 and 18. A square cut portion 19 and a square cut portion 20 are formed in face 16 and face 14 respectively, and a strainer 21 is mounted to cover the cut-out portions of both faces, the strainer 21 extending from the one face to the other face in a continuous form. The strainer 21 may be attached to faces 14 and 16 in any standard fashion such as cementing thereto or stitching thereto. Although element 11 has been described as formed with two faces 14 and 16 that are separated from each other, it is apparent that element 11 may be formed of a material such as paper or cardboard, and in this instance the sides 17 and 18 are formed with a fold at the center so that the complete element may be pressed down into a perfectly flat formation for shipment or storing, whereas, in use, by unfolding sides 17 and 18, element 11 may be formed as illustrated in Fig. 1. It is apparent, in use, that when the paint can 10 is opened, that is, the cover removed, element 11, by means of its adhesive face, may be pressed onto the open face of the paint can to completely cover the chime of the can and after it has been thoroughly sealed to cover the chime of the can, it is ready for use. In use, paint may be poured from the can as illustrated in Fig. 1, and the paint will flow through the strainer 21 to be thoroughly strained. When the can is set upon its base as illustrated in Fig. 4, any paint remaining on face 14 will tend to run back into the can. This is due to the fact that the edges of the paint can to which element 11 is pressed into a cemented relationship are not perfectly level, that is the inner edge of the chime is lower than the outer edge. Thus, face 14 will actually be sloped toward the aperture 15 after element 11 has been affixed to the face 12. This slight slant is sufficient to cause any excess paint to drain back into the can. It is also apparent in Figs. 4 and 5 that when the paint can is set on its base the strainer end of the can provides a resting place for the paint brush, that is, the paint end of the brush may rest in the strainer portion without spilling paint into the chime or over the edge of the paint can and in use, when dipping paint from the paint can the paint brush may be wiped off on the internal edge of element 11 and, of course, the paint will drip back into the paint can 10.

Referring to Fig. 2, there is illustrated a further embodiment of this invention that is somewhat similar to element 11 of Fig. 1. In this embodiment there is provided an element 11A similar to element 11, except that the outer periphery of element 11A is provided with an upturned shoulder 23. Thus, in the event element 11A had an excessive amount of paint on a top surface, the paint would not spill over the edge of element 11A due to the shoulder 23. This retaining shoulder would prevent the excess paint from escaping. It is also to be noted in this embodiment that the sides 17A and 18A may be formed as rigid sides rather than foldable, as illustrated in Fig. 1, thus providing greater strength.

Referring to Fig. 3, there is illustrated a still further embodiment of the pouring spout and strainer similar to Figs. 1 and 2, except that in this instance the surface of element 11B that is adjacent to the paint can when it is mounted is provided with a circular rim 25 similar to the rim provided on the cover of the paint can. This ring or rim must fit the chime of the paint can with which element 11B is to be utilized, that is, there is a particular size element 11B for each standard size of paint can. In this embodiment the adhesive may or may not be provided to the lower face of element 11B, that is, the adhesive will form a seal around the entire face to prevent the possibility of any leakage into the chime of the paint can or, as shown in Fig. 3, element 11B may be fitted tightly to the paint can 10, thus providing a frictional grip to retain element 11B in this position during its use. It is apparent that in pouring paint into the pouring spout and strainer end of element 11B, the only force tending to tear element 11B from the paint can 10 would be a sheer force on the axis X—X. This force is negligible and may be easily provided in either instance, whether the ring 25 of Fig. 3 is provided to anchor element 11B to the can 10 or, in the previous embodiments, if elements 11 or 11A depend upon an adhesive to retain them affixed to the face 12 of the paint can 10.

Referring to Fig. 6, it is apparent that element 11 of Fig. 1 may be varied to assume the shape illustrated in Fig. 6 or may be preformed to provide an element 11C. In this embodiment the chime cover is formed as a half circle rather than a full circle and sufficient adhesion may be obtained to retain element 11C affixed to the open end 12 of a paint can while in use. In this embodiment element 11C, in addition to the strainer 21C formed in the spout end of 11C, is also provided with a straining element 27 fitted into the portion 14A and due to this portion being formed as a semi-circle, strainer 27 will likewise be formed as a semi-circle with a straight edge 28 across the diameter of the semi-circle. This edge 28 provides an appropriate surface for wiping the paint brush when it is lifted from the paint can loaded with paint. Strainer 27 will, of course, strain the paint that is poured out of the paint can and the paint will again be strained passing through strainer 21C. However, in use, since paint has a tendency to congeal and to gather any residue such as dust, if the paint should dry on the inner surface of strainer 21C when the paint can is set on its base, none of the residue or skin formed can fall back into the paint can as strainer 27 will permit the paint to flow back but will prevent any foreign matter or residue to pass therethrough. Thus, a paint brush that is not clean or that has any residue thereon may be wiped on the edge 29 of the spout so that the foreign matter or residue will fall into the strainer spout and will not be returned into the paint can.

Referring to Fig. 7, there is illustrated a further embodiment of this invention in which there is an element 11D formed somewhat similar to element 11 of Fig. 1 except that there is no strainer in the pouring spout. The pouring spout may be formed in any usual manner and element 11D is adhesively affixed to cover the chime of the paint can, but in this embodiment the aperture 15A is completely covered by a strainer 30. Thus, it is apparent that any paint poured from the paint can must pass through the strainer 30 and, likewise, when the paint can is set on its base any paint in the spout that is returned to the paint can must re-pass through the strainer 30.

Referring to Fig. 8, there is illustrated a cardboard or other rigid bendable element that may be stamped out as a perfectly flat element in which there is a central aperture 15B of a diameter slightly less than the internal diameter of a paint can with which the element 11E is to be used. At one side of element 11E there is an extended portion 31. In this portion 31 a plurality of small apertures 32 are formed, the size of apertures 32 depending upon the use to which element 11E is to be utilized, that is, for certain types of liquids the apertures must be extremely small comparative to the small network of a screen for a similar use, whereas if the liquid to be poured is of a heavier consistency apertures 32 must be slightly larger to permit a reasonable flow through apertures 32. Element 11E on its extended end 31 is provided with a pair of ear-shaped formations 33 and 34 which may or may not have a crimping or creasing effect along the dotted lines 35, 36 and 37 to ensure a folding of the ears 33 and 34, and the outer end 38 of portion 31 may similarly be scored along the dotted line 39 to ensure the folding of edge 38 along the dotted line 39. With the portions prescored, it is a simple matter to bend portion 31 back upon element 11E and by means of the side ear portions 33 and 34 the edges 40 and 41 may be cemented or glued to the edges 42 and 43 of portion 31. The edge 38 is folded back upon itself to provide greater strength across edge 38 and may be cemented or glued in this relationship. Thus, it is apparent that the flat element 11E may be readily formed into a pouring spout and strainer that is similar to that illustrated in Fig. 1 and, of course, may be used in a similar fashion to that illustrated in Fig. 1, by applying an adhesive to one face of element 11E so that element 11E may be readily pressed into a fixed relationship with a paint can.

A further embodiment of this invention is illustrated in Fig. 9 in which the pouring spout and strainer is formed as a rigid element 11F attached to a circular element 45. The complete structure may be stamped out in metal, or may be poured in plastic, or may be formed of cardboard, but, in any instance, ring 45 is formed with a protruding rim 46 to fit the chime of a paint can with which the element 11F is to be utilized.

It is apparent that in practically all forms of this invention the elements 11, 11A, 11B, 11C, 11D and 11E are dependent upon an adhesive to retain the element affixed to the open end 12 of a paint can. Basically, this assembly of the element to the face of the paint can with an adhesive involves placing cleaned and coated parts (the element coated) in juxtaposition, bringing the faying surfaces (rim surface at either side of the chime) and adhesives in intimate contact and establishing a bond of the desired physical properties. The various technics for doing this depend on materials involved, their shape and the properties of the adhesive. With most of the adhesives that may be used for this purpose pressure is all that is required to establish a good bond, and thus hold the adherents in fixed relative position while the adhesive is set. This makes a uniform complete contact between the adherents and adhesive. It is important that the amount of pressure be adequate to form an equal bond around the entire edge of the chime. It is also to be understood that, although this invention speaks of an adhesive, the type of adhesive may be varied according to the liquids that are to be poured as certain liquids will attack and destroy the adhesion with certain adhesives, thus the proper adhesive must be provided in the event certain liquids are to be handled. In most instances the elements 11, 11A, 11B, 11C, 11D and 11E may be provided with an adhesive that will flow under pressure and will provide an immediate bond with high peel resistance. The strength of the adhesive once it is bonded to the end of the paint can is in reality a straight pull or sheer force, thus it is the entire surface of both circular edges of the chime that provides the entire area that the bond is retained to. This provides ample strength and, of course, a much higher strength than the peel strength.

The pouring spout and strainer for a paint can, with or without a chime, that is described herein, is primarily a disposable cheap paper or cardboard element. This element has all the qualities of a better constructed element but may be thrown away so that none of the mess of cleaning is involved. This element is also much lighter in weight and easily folded to be easily stored or shipped. This element also provides a sufficient grip and seal for any pouring operation. Further, this element, when affixed to a paint can, is not flat, rather, the whole circular formation pitches toward the central aperture, assisting in draining all paint or fluid back into the can. This element presents a flat rim that can retain printed matter such as advertising.

Although the pouring spout and strainer has been described as affixed to a paint can and providing a chime cover for a paint can, it is to be understood that this element may likewise be applied to other containers for liquids, granular materials, etc. without departing from the spirit of this invention and this invention shall be limited only by the appended claims.

What is claimed is:

1. In combination, a pouring spout and strainer for a paint can in which the can is provided with a chime in one face thereof, said pouring spout and strainer being formed of a fairly rigid but flat foldable material, said pouring spout being shaped as a four-sided portion of triangular cross section and having a circular, centrally apertured, integral portion extending from the spout, said pouring spout also being provided with a central aperture, the strainer covering said pouring spout aperture, and an adhesive on the under side of said circular portion so that it may be pressed against the open face of a paint can to provide a tight adhesion between the circular portion and the face of the paint can to completely cover the chime of the paint can.

2. In a device according to claim 1, in which the central aperture of the element is of a smaller diameter than the smallest diameter of the open end of the paint can to provide a sharply defined edge for wiping a paint brush of all excess paint.

3. In a device according to claim 1, in which the element is constructed of a cardboard and in which a pouring spout is foldable to lie in a perfectly flat relationship when not in use and in which a pouring spout is unfolded to open position for pouring.

4. In a device according to claim 1, in which the open pouring spout portion of the element provides a surface to retain a paint brush while being used and, in addition, provides means to drain excess paint back into the paint can.

5. In a device according to claim 1, in which the adhesive is of the type that will flow under pressure and provide an immediate bond and, in addition, provide a high peel resistance.

6. In combination, a pouring spout and strainer for a paint can in which the can is provided with a chime in one face thereof, said pouring spout and strainer being formed of a fairly rigid but flat foldable material, said pouring spout being shaped as a four-sided portion of triangular cross section and having a circular, centrally apertured, integral portion extending from the spout, said central aperture having a smaller diameter than the smallest diameter of the open end of the paint can with which it is to be used, said pouring spout also being provided with a central aperture, the strainer covering said pouring spout aperture, said spout provided with a pair of scored foldable sides, and an adhesive on the under side of said circular portion so that it may be pressed against the open face of a paint can to provide a tight adhesion between the circular portion and the face of the paint can to completely cover the chime of the paint can.

7. In a device according to claim 6, in which the size and spacing of the straining element may be increased to a predetermined limit according to the viscosity of the liquid to be poured through the strainer element.

8. In combination, a pouring spout and strainer for a paint can in which the can is provided with a chime in one face thereof, said pouring spout and strainer being formed of a semi-rigid but foldable material, said pouring spout being shaped as a four-sided portion of triangular cross section and having a circular, centrally apertured, integral portion extending from the spout, said central aperture having an upturned lip around the outer periphery, said pouring spout also being provided with a central aperture, the strainer covering said pouring spout aperture, and an adhesive on the under side of said circular portion so that it may be pressed against the open face of a paint can to provide a tight adhesion between the circular portion and the face of the paint can to completely cover the chime of the paint can.

References Cited in the file of this patent

UNITED STATES PATENTS

| | | |
|---|---|---|
| 34,492 | Havord et al. | Feb. 25, 1862 |
| 1,959,584 | Hurley | May 22, 1934 |
| 2,471,189 | Bartels | May 24, 1949 |
| 2,511,111 | Jackubowski | June 13, 1950 |
| 2,606,694 | Galletta | Aug. 12, 1952 |
| 2,627,367 | Bork | Feb. 3, 1953 |
| 2,664,230 | Heim | Dec. 29, 1953 |
| 2,731,178 | Larsson | Jan. 17, 1956 |

FOREIGN PATENTS

| | | |
|---|---|---|
| 25,730 | Great Britain | 1913 |
| 598,956 | Great Britain | Mar. 2, 1948 |